US006982982B1

(12) United States Patent
Barker, Jr. et al.

(10) Patent No.: US 6,982,982 B1
(45) Date of Patent: Jan. 3, 2006

(54) SYSTEM AND METHOD FOR PROVIDING A CONGESTION OPTIMIZED ADDRESS RESOLUTION PROTOCOL FOR WIRELESS AD-HOC NETWORKS

(75) Inventors: Charles R. Barker, Jr., Orlando, FL (US); Michael A. Ruckstuhl, Orlando, FL (US); Eric A. Whitehill, Fort Wayne, IN (US)

(73) Assignee: MeshNetworks, Inc., Maitland, FL (US)

( * ) Notice: Subject to any disclaimer, the term of this patent is extended or adjusted under 35 U.S.C. 154(b) by 304 days.

(21) Appl. No.: 09/983,176

(22) Filed: Oct. 23, 2001

(51) Int. Cl.
*H04L 12/28* (2006.01)
*H04L 12/56* (2006.01)

(52) U.S. Cl. .................. 370/395.54; 370/338; 370/401

(58) Field of Classification Search ................ 370/338, 370/310, 312, 390, 400, 401, 328, 329, 349, 370/351, 395.52, 395.54, 352, 466, 467, 370/475, 395.31, 395.32
See application file for complete search history.

(56) References Cited

U.S. PATENT DOCUMENTS

| | | | | |
|---|---|---|---|---|
| 4,494,192 | A | 1/1985 | Lew et al. | 710/112 |
| 4,617,656 | A | 10/1986 | Kobayashi et al. | 370/445 |
| 4,736,371 | A | 4/1988 | Tejima et al. | 370/236 |
| 4,742,357 | A | 5/1988 | Rackley | 342/457 |
| 4,747,130 | A | 5/1988 | Ho | 379/269 |
| 4,910,521 | A | 3/1990 | Mellon | 342/45 |
| 5,034,961 | A | 7/1991 | Adams | 375/130 |
| 5,068,916 | A | 11/1991 | Harrison et al. | 455/39 |
| 5,231,634 | A | 7/1993 | Giles et al. | 370/348 |
| 5,233,604 | A | 8/1993 | Ahmadi et al. | 370/238 |
| 5,241,542 | A | 8/1993 | Natarajan et al. | 370/311 |
| 5,317,566 | A | 5/1994 | Joshi | 370/238 |
| 5,392,450 | A | 2/1995 | Nossen | 455/12.1 |
| 5,412,654 | A | 5/1995 | Perkins | 370/312 |
| 5,424,747 | A | 6/1995 | Chazelas et al. | 342/70 |
| 5,502,722 | A | 3/1996 | Fulghum | 370/343 |

(Continued)

FOREIGN PATENT DOCUMENTS

CA 2132180 3/1996

(Continued)

OTHER PUBLICATIONS

J.J. Garcia-Luna-Aceves and Asimakis Tzamaloukas, "Reversing the Collision-Avoidance Handshake in Wireless Networks".

(Continued)

*Primary Examiner*—Brian Nguyen
(74) *Attorney, Agent, or Firm*—Gardner Carton & Douglas, LLP; Joseph J. Buczynski

(57) ABSTRACT

A system and method for providing a congestion optimized address resolution protocol (ARP) for a wireless ad-hoc network. The system and method enables a node in the wireless ad-hoc network to issue an ARP request without the need to broadcast the request to all of the nodes in the wireless ad-hoc network, to thus minimize radio traffic on the wireless ad-hoc network for handling the ARP request. The node includes an address resolution protocol module which is adapted to generate an ARP request for a media access control (MAC) address corresponding to an Internet protocol (IP) address, and a transceiver which is adapted to transmit the ARP request for delivery to an access point of a network portion, such as a core LAN of the network, without broadcasting the ARP request to a plurality of other nodes in the wireless ad-hoc network. The transceiver can transmit the ARP request to the access point directly or via other nodes in the wireless ad-hoc network.

52 Claims, 3 Drawing Sheets

U.S. PATENT DOCUMENTS

| | | | | |
|---|---|---|---|---|
| 5,517,491 | A | 5/1996 | Nanni et al. | 370/252 |
| 5,555,425 | A | 9/1996 | Zeller et al. | 710/110 |
| 5,555,540 | A | 9/1996 | Radke | 370/462 |
| 5,572,528 | A | 11/1996 | Shuen | 370/402 |
| 5,615,212 | A | 3/1997 | Ruszczyk et al. | 370/433 |
| 5,618,045 | A | 4/1997 | Kagan et al. | 463/40 |
| 5,621,732 | A | 4/1997 | Osawa | 370/346 |
| 5,623,495 | A | 4/1997 | Eng et al. | 370/397 |
| 5,627,976 | A | 5/1997 | McFarland et al. | 710/309 |
| 5,631,897 | A | 5/1997 | Pacheco et al. | 370/237 |
| 5,644,576 | A | 7/1997 | Bauchot et al. | 370/437 |
| 5,652,751 | A | 7/1997 | Sharony | 370/227 |
| 5,680,392 | A | 10/1997 | Semaan | 370/261 |
| 5,684,794 | A | 11/1997 | Lopez et al. | 370/337 |
| 5,687,194 | A | 11/1997 | Paneth et al. | 375/283 |
| 5,696,903 | A | 12/1997 | Mahany | 709/228 |
| 5,701,294 | A | 12/1997 | Ward et al. | 370/252 |
| 5,706,428 | A | 1/1998 | Boer et al. | 370/342 |
| 5,717,689 | A | 2/1998 | Ayanoglu | 370/349 |
| 5,745,483 | A | 4/1998 | Nakagawa et al. | 370/335 |
| 5,774,876 | A | 6/1998 | Wooley et al. | 705/28 |
| 5,781,540 | A | 7/1998 | Malcolm et al. | 370/321 |
| 5,787,080 | A | 7/1998 | Hulyalkar et al. | 370/310.2 |
| 5,794,154 | A | 8/1998 | Bar-On et al. | 455/509 |
| 5,796,732 | A | 8/1998 | Mazzola et al. | 370/362 |
| 5,796,741 | A | 8/1998 | Saito et al. | 370/439 |
| 5,805,593 | A | 9/1998 | Busche | 370/396 |
| 5,805,842 | A | 9/1998 | Nagaraj et al. | 710/313 |
| 5,805,977 | A | 9/1998 | Hill et al. | 340/7.22 |
| 5,809,518 | A | 9/1998 | Lee | 711/115 |
| 5,822,309 | A | 10/1998 | Ayanoglu et al. | 370/315 |
| 5,844,905 | A | 12/1998 | McKay et al. | 370/443 |
| 5,845,097 | A | 12/1998 | Kang et al. | 710/117 |
| 5,857,084 | A | 1/1999 | Klein | 710/305 |
| 5,870,350 | A | 2/1999 | Bertin et al. | 365/233 |
| 5,877,724 | A | 3/1999 | Davis | 342/357.1 |
| 5,881,095 | A | 3/1999 | Cadd | 375/132 |
| 5,881,372 | A | 3/1999 | Kruys | 455/113 |
| 5,886,992 | A | 3/1999 | Raatikainen et al. | 370/410 |
| 5,896,561 | A | 4/1999 | Schrader et al. | 455/67.11 |
| 5,903,559 | A | 5/1999 | Acharya et al. | 370/355 |
| 5,909,651 | A | 6/1999 | Chander et al. | 455/466 |
| 5,936,953 | A | 8/1999 | Simmons | 370/364 |
| 5,943,322 | A | 8/1999 | Mayor et al. | 370/280 |
| 5,987,011 | A | 11/1999 | Toh | 370/331 |
| 5,987,033 | A | 11/1999 | Boer et al. | 370/445 |
| 5,991,279 | A | 11/1999 | Haugli et al. | 370/311 |
| 6,028,853 | A | 2/2000 | Haartsen | 370/338 |
| 6,029,217 | A | 2/2000 | Arimilli et al. | 710/107 |
| 6,034,542 | A | 3/2000 | Ridgeway | 326/39 |
| 6,044,062 | A | 3/2000 | Brownrigg et al. | 370/238 |
| 6,047,330 | A | 4/2000 | Stracke, Jr. | 709/238 |
| 6,052,594 | A | 4/2000 | Chuang et al. | 455/450 |
| 6,052,752 | A | 4/2000 | Kwon | 710/306 |
| 6,064,626 | A | 5/2000 | Stevens | 365/233 |
| 6,067,291 | A | 5/2000 | Kamerman et al. | 370/338 |
| 6,078,566 | A | 6/2000 | Kikinis | 370/286 |
| 6,104,712 | A | 8/2000 | Robert et al. | 370/389 |
| 6,108,738 | A | 8/2000 | Chambers et al. | 710/113 |
| 6,115,580 | A | 9/2000 | Chuprun et al. | 455/1 |
| 6,122,690 | A | 9/2000 | Nannetti et al. | 710/311 |
| 6,130,881 | A | 10/2000 | Stiller et al. | 370/238 |
| 6,130,892 | A | 10/2000 | Short et al. | 370/401 |
| 6,132,306 | A | 10/2000 | Trompower | 453/11.1 |
| 6,147,975 | A | 11/2000 | Bowman-Amuah | 370/252 |
| 6,163,699 | A | 12/2000 | Naor et al. | 455/453 |
| 6,178,337 | B1 | 1/2001 | Spartz et al. | 455/561 |
| 6,192,053 | B1 | 2/2001 | Angelico et al. | 370/448 |
| 6,192,230 | B1 | 2/2001 | Van Bokhorst et al. | 455/343.3 |
| 6,208,870 | B1 | 3/2001 | Lorello et al. | 455/466 |
| 6,223,240 | B1 | 4/2001 | Odenwald et al. | 710/311 |
| 6,240,294 | B1 | 5/2001 | Hamilton et al. | 455/456.3 |
| 6,246,875 | B1 | 6/2001 | Seazholtz et al. | 455/432.1 |
| 6,249,516 | B1 | 6/2001 | Brownrigg et al. | 370/338 |
| 6,275,707 | B1 | 8/2001 | Reed et al. | 455/456.3 |
| 6,285,892 | B1 | 9/2001 | Hulyalkar | 455/574 |
| 6,304,556 | B1 | 10/2001 | Haas | 370/254 |
| 6,307,843 | B1 * | 10/2001 | Okanoue | 370/312 |
| 6,327,300 | B1 | 12/2001 | Souissi et al. | 375/219 |
| 6,349,091 | B1 | 2/2002 | Li | 370/238 |
| 6,349,210 | B1 | 2/2002 | Li | 455/450 |
| 2001/0005368 | A1 * | 6/2001 | Rune | 370/390 |
| 2001/0024443 | A1 * | 9/2001 | Alriksson et al. | 370/401 |
| 2001/0053699 | A1 | 12/2001 | McCrady et al. | 455/513 |
| 2002/0013856 | A1 * | 1/2002 | Garcia-Luna-Aceves et al. | 709/238 |
| 2002/0044549 | A1 * | 4/2002 | Johansson et al. | 370/386 |

FOREIGN PATENT DOCUMENTS

| | | | |
|---|---|---|---|
| EP | 0513841 | A2 | 11/1992 |
| EP | 0513841 | A3 | 11/1992 |
| EP | 0627827 | A2 | 12/1994 |
| EP | 0924890 | A2 | 6/1999 |
| FR | 2683326 | | 7/1993 |
| WO | WO 9608884 | | 3/1996 |
| WO | WO 9724005 | | 7/1997 |
| WO | WO 9839936 | | 9/1998 |
| WO | WO 9912302 | | 3/1999 |
| WO | WO 0034932 | | 6/2000 |
| WO | WO 0110154 | | 2/2001 |
| WO | WO 0133770 | | 5/2001 |
| WO | WO 0135567 | | 5/2001 |
| WO | WO 0137481 | | 5/2001 |
| WO | WO 0137482 | | 5/2001 |
| WO | WO 0137483 | | 5/2001 |
| WO | WO 0235253 | | 5/2002 |

OTHER PUBLICATIONS

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

Jill Kaufman entitled "ATM Forum Education Corner", ATM Forum, 2001.

Rajeev Gupta entitled "The 'Glue' of Networks: Looking at IP over ATM", ATM Forum, 2001.

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.
Andras G. Valko, "Cellular IP: A New Approach to Internet Host Mobility", Jan. 1999, ACM Computer Communication Review.
Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.
"OSPF Version 2", Apr. 1998, Internet RFC/STD/FYI/BCP Archives.
Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.
Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.
C. David Young, "USAP: A Unifying Dynamic Distributed Multichannel TDMA Slot Assignment Protocol".
Chip Elliott and Bob Heile, "Self-Organizing, Sef-Healing Wireless Networks", 2000 IEEE.

* cited by examiner

SYSTEM AND METHOD FOR PROVIDING A CONGESTION OPTIMIZED ADDRESS RESOLUTION PROTOCOL FOR WIRELESS AD-HOC NETWORKS

BACKGROUND OF THE INVENTION

1. Field of the Invention

The present invention relates to a system and method for providing a congestion optimized address resolution protocol for wireless ad-hoc networks. More particularly, the present invention relates to a system and method for enabling a node on a wireless ad-hoc network to issue an address resolution protocol request without the need to broadcast the request to a plurality of other nodes on the wireless ad-hoc network, to thus minimize the amount of traffic on the network necessary to handle the request.

2. Description of the Related Art

In recent years, a type of mobile communications network known as an "ad-hoc" network has been developed for use by the military. In this type of network, each user terminal is capable of operating as a base station or router for the other user terminals, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling user terminals to communicate with each other as in a conventional ad-hoc network, further enable user terminals, also referred to as subscriber devices, to access a fixed network and thus communicate with other user terminals, such as those on the public switched telephone network (PSTN), and on other networks such as a local area network (LAN) and the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, the entire content of both of said patent applications being incorporated herein by reference.

Address Resolution Protocol (ARP) is a protocol for mapping an Internet Protocol address (IP address) to a physical machine address that is recognized in a local network, such as a LAN. For example, in IP Version 4, which is the most common level of IP in use today, an address is 32 bits long. In an Ethernet local area network, however, addresses for attached devices are 48 bits long. The physical machine address is also commonly referred to as a Media Access Control or MAC address. A table, usually called the ARP cache, is used to maintain a correlation between each MAC address and its corresponding IP address. ARP provides the protocol rules for making this correlation and providing address conversion in both directions, that is, from IP address to MAC address and vice-versa.

ARP functions in the following manner. When an incoming packet destined for a host machine on a particular LAN arrives at a gateway on the LAN, the gateway requests that the ARP program find a physical host or MAC address that matches the IP address. The ARP program looks in the ARP cache at the gateway and, if it finds the MAC address, provides the MAC address so that the packet can be converted and formatted as appropriate and sent to the machine. If no entry is found for the IP address in the ARP cache, the ARP program broadcasts a request packet in a special format to all the machines on the LAN to see if any machine recognizes that IP address as being associated with its MAC address. A machine that recognizes the IP address as its own returns an affirmative reply to the ARP program. A machine configured to respond to requests for an IP addresses other than its own, for which it is said to proxy, returns an affirmative reply if it recognizes the IP address as one for which it is so configured. In response, the ARP program updates the ARP cache for future reference, and then sends the packet to the machine having the MAC address associated with the IP address for which the packet is intended. Examples of conventional ARP techniques performed in asynchronous transfer mode (ATM) networks employing LANs are described in a publication by M. Laubach and J Halpern entitled "Classical IP and ARP over ATM", IETF RFC 2225, April, 1998, in a publication by Jill Kaufman entitled "ATM Forum Education Corner", ATM Forum, 2001, and in a publication by Rajeev Gupta entitled "The 'Glue' of Networks: Looking at IP over ATM", ATM Forum, 2001, the entire contents of each of these documents is incorporated herein by reference.

Although the process described above is suitable for use with wired networks and broadcast wireless, the process is not suitable for use in an ad-hoc wireless network. Specifically, in an ad-hoc wireless network, when the ARP of a node causes a broadcast of the ARP request packet to all the nodes on the wireless network, such a broadcast could flood the radio network since it would be required to be repeated by every node to ensure completeness.

The MANET working group within the IETF is evaluating techniques in which to accomplish the delivery of such broadcast messages from a node in a wireless LAN. For example, the message can be via a broadcast of the IP address to all nodes on the network, or via a single hop broadcast to only neighboring nodes. In the case in which the message is broadcast to all nodes on the network, the amount of radio traffic generated on the network is enormous because each node must insure that its neighbors receive the message. Although certain techniques can be used to reduce this overhead, there is no mechanism for delivering a broadcast message toward a destination capable of resolving the ARP. Alternatively, in the single hop case, a node which is not directly connected to a node which can resolve the ARP request will never receive a reply. In addition, in either case, the reliability of the broadcast transfer can be severely impacted by the hidden terminal problem common in ad-hoc networks, as well as the near/far problem in which a node near to a node receiving a signal from a more distant node inadvertently transmits to the near node and thus destroys the ongoing reception from the distant node. A hidden terminal is a node which is out of range of a transmitting node and can therefore destroy an ongoing reception. This effect is particularly detrimental to broadcast transmissions which do not require a clear-to-send operation by the receiving node. Without the clear to send, the hidden terminal has no knowledge that a transmission is occurring and is free to attempt a transmission. An example of a non-broadcast multi-access subnetwork (NBMA) is described in a publication by J. Luciani et al. entitled "NBMA Next Hop Resolution Protocol (NHRP)", IETF RFC 2332, April 1998, the entire contents of which is incorporated herein by reference.

Accordingly, a need exists for a system and method for improving the manner in which ARP is performed on wireless ad-hoc networks.

SUMMARY OF THE INVENTION

An object of the present invention is to provide a system and method for providing a congestion optimized ARP for a wireless ad-hoc network.

Another object of the present invention is to provide a system and method for enabling a node in a wireless ad-hoc network to issue an ARP request without the need to broadcast the request to all of the nodes on the wireless ad-hoc network.

A further object of the present invention is to provide a system and method for enabling a node on a wireless ad-hoc network to issue an ARP request and receive a response to the ARP request with minimal traffic on the network.

These and other objects are substantially achieved by providing a system and method for providing a congestion optimized address resolution protocol (ARP) for a wireless ad-hoc network. The system and method enables a node in a wireless ad-hoc network to issue an ARP request without the need to broadcast the request to all of the nodes in the wireless ad-hoc network, to thus minimize radio traffic on the wireless ad-hoc network for handling the ARP request. The node includes an address resolution protocol module which is adapted to generate an ARP request for a media access control (MAC) address corresponding to an Internet protocol (IP) address, and a transceiver which is adapted to transmit the ARP request for delivery to an access point of a network portion, such as a core LAN of the network, without broadcasting the ARP request to a plurality of other nodes in the wireless ad-hoc network. The transceiver can transmit the ARP request to the access point directly or via other nodes in the wireless ad-hoc network.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
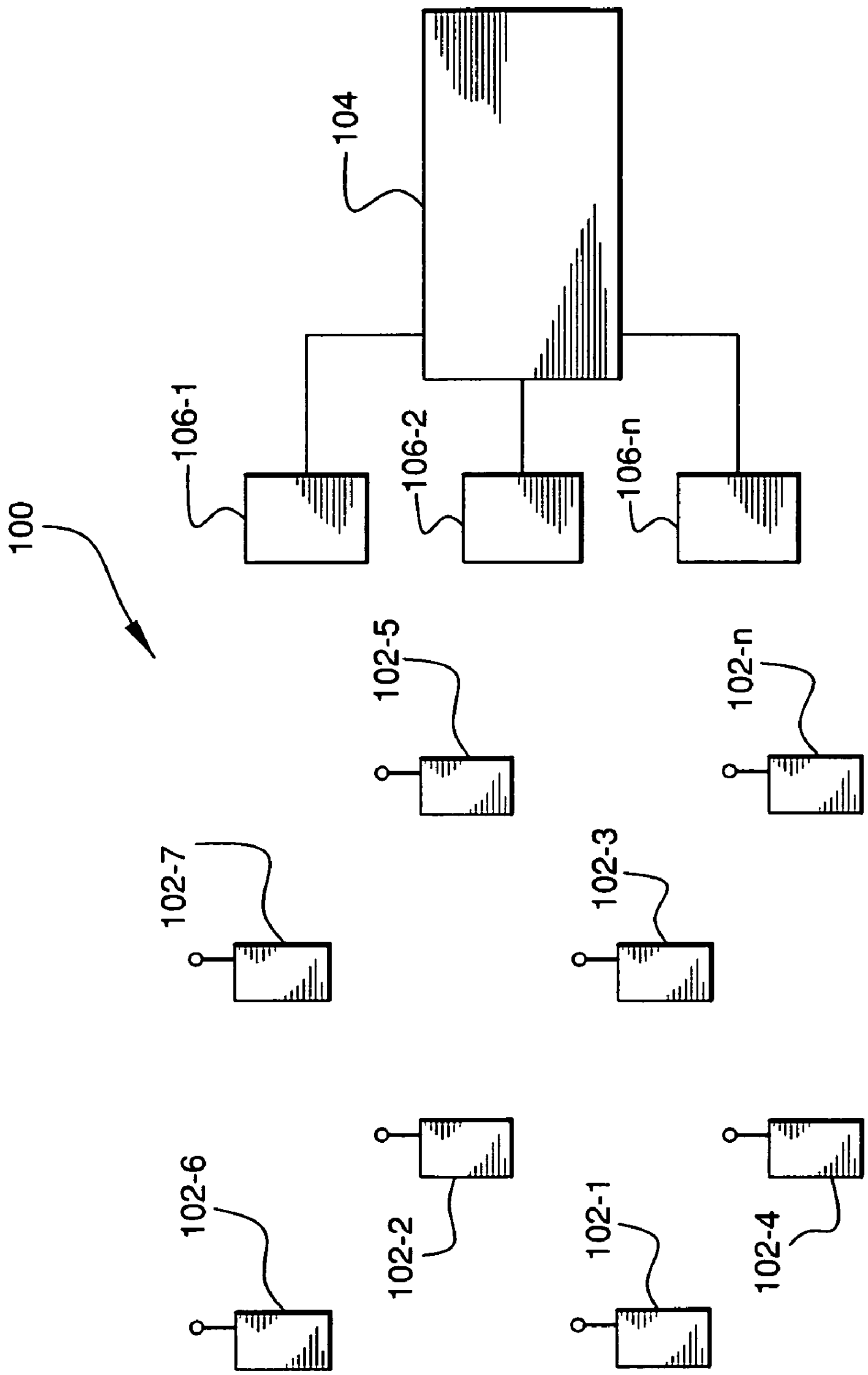
FIG. 1 is a block diagram of an example of an ad-hoc packet-switched wireless communications network employing a system and method for providing a congestion optimized ARP according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless subscriber devices 102-1 through 102-n (referred to generally as subscriber devices 102), and a fixed network 104 having a plurality of access points 106-1, 106-2, . . . , 106-n, for providing the subscriber devices 102 with access to the fixed network 104. The fixed network 104 includes, for example, a core local access network (LAN), and a plurality of servers and gateway routers, to thus provide the subscriber devices 102 with access to other networks, such as the public switched telephone network (PSTN), the Internet or another wireless ad-hoc network.

Figure 2:
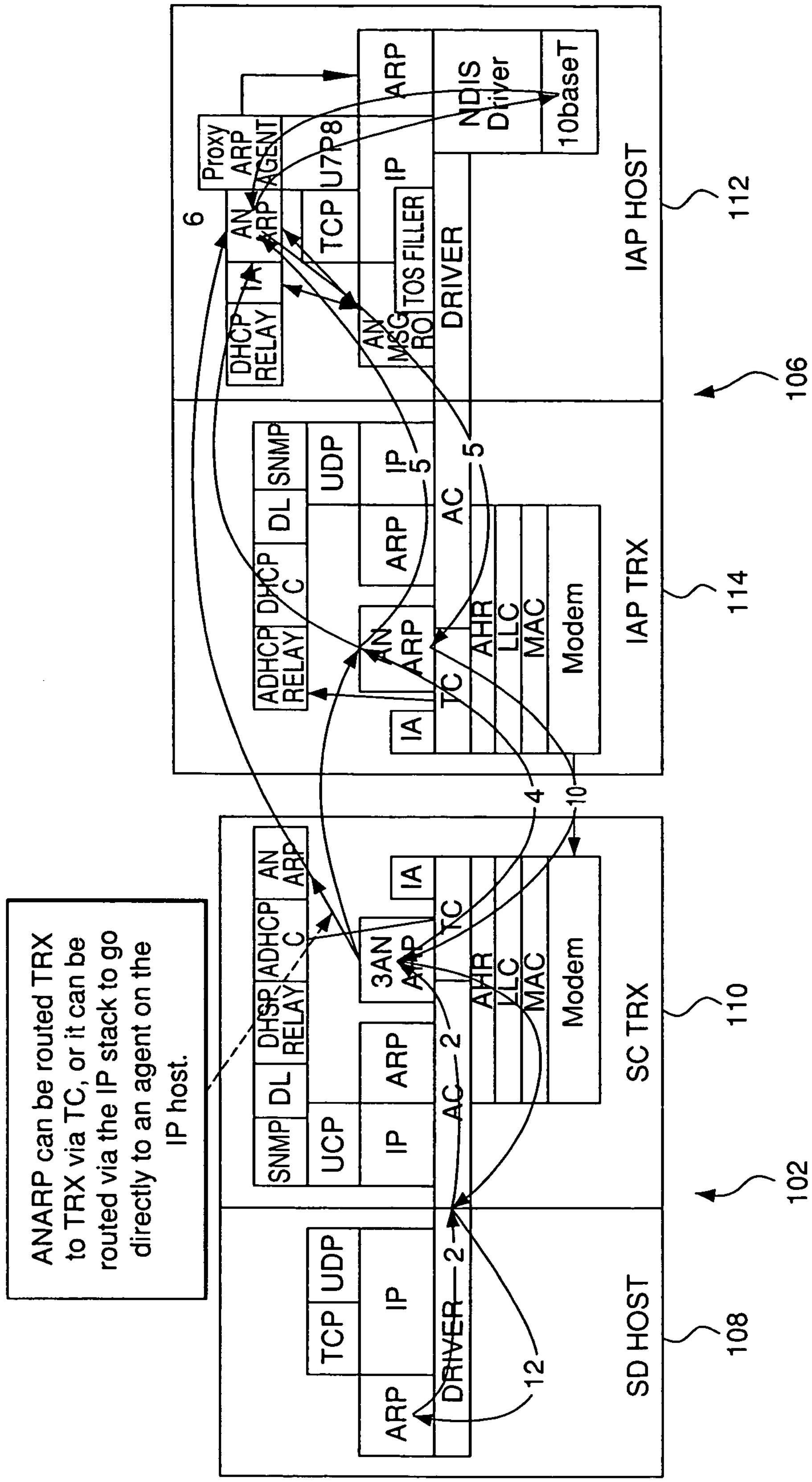
FIG. 2 is a conceptual block diagram illustrating an example of communication exchanges between a subscriber device and an intelligent access point on the network shown in FIG. 1 when performing an ARP according to an embodiment of the present invention.

The subscriber devices 102 are capable of communicating with each other directly, or via one or more other subscriber devices 102 operating as a router or routers for data packets being sent between subscriber devices 102, as described in U.S. Pat. No. 5,943,322 to Mayor and in U.S. patent application Ser. Nos. 09/897,790 and 09/815,157, referenced above. As shown in FIG. 2, each subscriber device 102 includes a subscriber device host 108 which can be, for example, a notebook computer terminal, mobile telephone unit, mobile data unit, or any other suitable device. Each subscriber device 102 further include a transceiver 110 that is capable of receiving and transmitting signals, such as packetized data signals, to and from the subscriber device 102, via a modem as, for example, a radio frequency (RF) transmission under the control of a controller (not shown). The packetized data signals can include, for example, voice, data or multimedia.

Each subscriber device host 108 includes the appropriate hardware and software to perform Internet Protocol (IP) and Address Resolution Protocol (ARP), the purposes of which can be readily appreciated by one skilled in the art. The subscriber device host 108 can optionally include the appropriate hardware and software to perform transmission control protocol (TCP) and user datagram protocol (UDP). Furthermore, a subscriber device host 108 includes a driver to provide an interface between the subscriber device host 108 and the transceiver 110 in the subscriber device 102.

In addition to including a modem, the transceiver 110 includes the appropriate hardware and software to provide IP, ARP, admission control (AC), traffic control (TC), ad-hoc routing (AHR), logic link control (LLC) and MAC. The transceiver 110 further includes the appropriate hardware and software for IAP association (IA), UDP, simple network management protocol (SNMP), data link (DL) protocol and dynamic host configuration protocol (DHCP) relaying.

The Admission Control (AC) module acts on packets flowing between the IP stack module of the subscriber device host 108, the IP stack module of the subscriber device transceiver 110, and the traffic control (TC) module of the subscriber device transceiver 110. The IP stack of the transceiver 110 will communicate directly with the AC module. The TC module passes formatted-message (i.e., those messages having Ad-Hoc Routing (AHR) headers) to the Logical Link Control module (LLC). The AC module also provides a number of services to these interfacing modules, including determination and labeling of Quality of Service (QoS) requirements for IP packets, throttling of higher-layer protocols, support of the Mobility Manager (not shown), and generation of appropriate responses to client service requests such as DHCP, ARP, and other broadcast messages. The AC module will rely on local broadcasts, ad hoc routing updates, and unicast requests for information destined to the associated IAP 106 to provide these services transparently to the IP stacks.

The AC module will further provide a routing mechanism to forward packets to the appropriate IP stack in the host 108 or transceiver 110. Several of the services provided by the AC module will require knowledge of the IP packet header and, potentially, the UDP or TCP headers. Any other services which require knowledge of these packet headers should be isolated within the AC module to help enforce a modular, layered design. Information obtained from these headers that is required by TC or lower layers are encoded in the AHR header, or passed out-of-band with the packet.

It can be further noted that all IP packets intended for transmission by the transceiver 110 are forwarded to the AC module. The AC module should receive packets in buffers with sufficient headroom to prepend the AHR and LLC headers. Specifically, AC module receives a packet over the host interface. AC module must choose a buffer big enough to hold the packet from the host interface and the media access control header information which the transceiver places in front of the message. Headers are in front of the packet to ease implementation. Ad Hoc packets that have been received over the wireless interface must be delivered to the appropriate IP stack for reception. In doing so, the AC module strips any header information below the IP packet and forwards only the IP packet to the IP stack. The AC module should also be IP-aware in order to flow packets to the proper stack. The AC module is further capable of flowing packets between the attached IP stacks without sending the packets to lower layers, which enables host-to-transceiver communication without sending packets to the air. The AC module also operates to intercept DHCP client messages from the host and transceiver IP stacks, and reply with the IP address and parameters obtained from the DHCP server on the core LAN, because the DHCP protocol does not have any knowledge of the Ad Hoc Routing protocol.

Further details of the operations and protocols described above are set forth in a U.S. provisional patent application of Eric A. Whitehill entitled "Embedded Routing Algorithms Under the Internet Protocol Routing Layer in a Software Architecture Protocol Stack", Ser. No. 60/297,769, filed on Jun. 14, 2001, the entire contents of which is incorporated herein by reference.

As further shown in FIG. 2, each IAP 106 includes an IAP host 112 and an IAP transceiver 114. The LAP host 112 includes the appropriate hardware and software to perform TCP, UDP, IP and ARP. Also, IAP host 112 includes the appropriate hardware and software to provide DHCP relaying, IA, a proxy ARP agent, and an NDIS driver. Furthermore, the IAP host 112 includes a driver to provide an interface between the IAP host 112 and the transceiver 114 in the IAP 106.

In addition to including a modem which can be similar to that in transceiver 110, the transceiver 114 includes the appropriate hardware and software to perform IP, ARP, AC, TC, AHR, LLC and MAC in a manner similar to that described above for the host 108 and transceiver 110. The transceiver 110 further includes the appropriate hardware and software for providing IA, UDP, SNMP, DL protocol and DHCP. Further details of the operations and protocols of IAP host 112 and transceiver 114 are discussed below and are set forth in U.S. provisional patent Ser. No. 60/297,769, referenced above.

As discussed in the Background section above, if a subscriber device 102 in an ad-hoc wireless network 100 were to broadcast an ARP request to all the wireless nodes on the network 100, including subscriber devices 102 and IAPs 106, such a broadcast can overload the radio network. Hence, as will now be described with reference to FIGS. 2 and 3, to overcome this problem, when a subscriber device host 108 sends an ARP request, the subscriber device transceiver 110 intercepts the ARP request and forwards it directly to an LAP 106 for resolution instead of performing a traditional broadcast of the ARP request. Specifically, the subscriber device 102 unicasts the ARP request to the LAP 106 which is capable of resolving the ARP request over the reliable backbone of the fixed network 104. It is noted that although FIG. 2 shows a subscriber device 102 communicating directly with an IAP 106, the system architecture and ad-hoc capabilities of the wireless network allows the message to hop through intermediate nodes 102 between the subscriber device 102 and the IAP 106.

The IAP 106 resolves the query by looking first in its own ARP cache tables, or, if necessary, by querying other nodes on the wired fixed network 104. The IAP 106 then returns a message to the subscriber device 102 containing the MAC address corresponding to the requested IP address. Specifically, the IAP 106 unicasts a reply to the requesting subscriber device 102. It is noted that in an ad-hoc network such as network 100, transfer of a unicast message from the IAP 106 to the subscriber device 102 is much more reliable than the transfer of a broadcast message.

Furthermore, it should be noted that the ARP request can be for a MAC address of another subscriber device 102 in the ad-hoc wireless network 100, which can be affiliated with the same IAP 106 as the requesting subscriber device 102 or with another IAP 106. For example, assuming that subscriber devices 102-5 and 102-7 shown in FIG. 1 are affiliated with IAP 106-1, if subscriber device 102-5 issues an ARP for the MAC address of subscriber device 102-7, IAP 106-1 can resolve this request and send to the subscriber device 102-5 a message containing the requested MAC address of subscriber device 102-7. Subscriber device 102-5 will therefore be capable of communicating directly with subscriber device 102-7 using that MAC address. On the other hand, if subscriber device 102-5 issues an ARP for the MAC address of a subscriber device (e.g., subscriber device 102-3) that is affiliated with a different IAP (e.g., LAP 106-2), IAP 106-1 can also resolve this request and send to the subscriber device 102-5 a message containing the requested MAC address of subscriber device 102-3. Subscriber device 102-5 will therefore be able to communicate with subscriber device 102-3 via LAP 106-1 using either the core network which is included in fixed network 104 shown in FIG. 1, or through other subscriber devices 102 in the ad-hoc wireless network 100 if the route is known.

In addition, if a subscriber device (e.g., subscriber device 102-5) issues an ARP for a MAC address of a device or machine on another network, such as a user terminal, server or the like, IAP 106-1 can also resolve this request and send to the subscriber device 102-5 a message containing the requested MAC address of that device or machine. Subscriber device 102-5 can thus communicate with that device or machine via IAP 106-1 and the core network, gateways and the like in fixed network 104 and in the other network with which that device or machine is affiliated.

Further details of these operations will now be described. FIG. 2 illustrates the transfer of information between components in the subscriber device host 108, subscriber device transceiver 110, IAP host 112 and IAP transceiver 114 to handle an ARP request generated at the subscriber device host 108. The numbers 1 through 12 in FIG. 2 correspond to steps 1 through 12 shown in the flowchart of FIG. 3.

Figure 3:
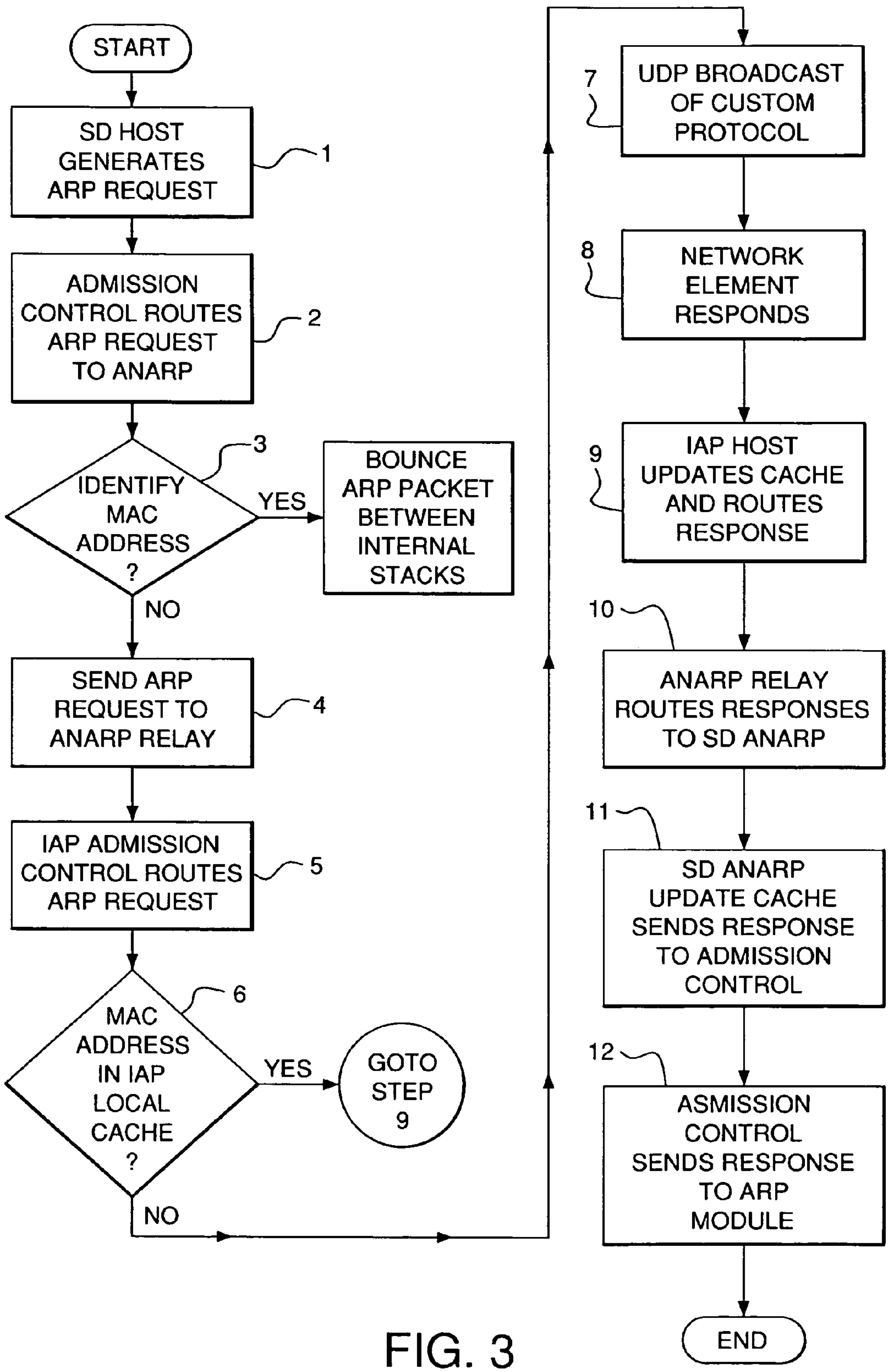
FIG. 3 is a flowchart showing an example of operations performed by the subscriber device and intelligent access point as shown in FIG. 2.

As indicated in step 1 in the flowchart of FIG. 3 and by arrow 1 in FIG. 2, when the ARP module of the subscriber device host 108 generates an ARP request, the admission control software intercepts the ARP request. In step 2, the Admission Control (AC) module routes the ARP request to a specialized ARP module which, in this example, is referred to as an ANARP module.

As indicated in step 3, upon receiving the ARP request, the ANARP module checks the local list which compares ARPs to MACs. It is noted that the ANARP module ignores ARP requests for transceiver IP addresses and subscriber device IP addresses, because the ARP modules on the IP stacks of the subscriber device host 108 and subscriber device transceiver 110 answer those requests. That is, when such ARP requests are made, the ARP is passed directly between the IP stacks of the subscriber device host 108 and subscriber device transceiver 110, and normal ARP rules apply.

If the ANARP module does not identify a corresponding MAC address, the process proceeds to step 4 during which ANARP module sends a directed custom message to a specialized module, referred to in this example as an ANARP relay, in the LAP transceiver 114 via TC module and the modems. Specifically, the custom message is sent as an RF transmission from the modem in the subscriber device transceiver 110 to the modem in the IAP transceiver 114. As stated above, due to the capability of the wireless ad-hoc network, the subscriber device transceiver 110 need not send the custom message directly to the IAP transceiver 114. Rather, the subscriber device transceiver 110 can send the message to a transceiver of another node 102 in the network 110, which can operate as a router to send the message to the IAP 106 or, if necessary, to another node 102. That is, the message can hop through several nodes 102 before reaching the IAP 106. Further details of these ad-hoc capabilities are described in U.S. Pat. No. 5,943,322 to Mayor and in U.S. patent application Ser. Nos. 09/897,790 and 09/815,157, referenced above.

As indicted in step 5, the admission control (AC) module in the IAP transceiver 114 routes the relayed ARP request to a specialized module, referred to in this example as an ANARP module, in IAP host 112. In step 6, the ANARP module in IAP host 112 examines its local cache to determine whether a MAC address is present that corresponds to the IP address in the ARP request. If the ANARP module does not find an MAC entry that matches the IP address in the ARP request, the process proceeds to step 7. In step 7, the ANARP module in IAP host 11 converts the directed request to a UDP broadcast of a custom protocol to some or all of the elements on the network 104 to which the IAP 106 provides access.

As shown in step 8, upon receiving the UDP broadcast, an element on the network 104 responds to the ARP request by providing the MAC address to the ANARP in the IAP host 112, again via a custom UDP protocol. In step 9, the ANARP module in the IAP host 112 converts this response as appropriate. Specifically, the custom UDP message is decoded to determine the MAC address. The IAP 112 then updates its cache, and routes the MAC address to the ANARP relay in the IAP transceiver 114 via the Admission Control (AC) module. In step 10, the ANARP relay routes the ANARP response to the ANARP module in the subscriber device transceiver 110 via the modems in the IAP transceiver 114 and the subscriber device transceiver 110. Specifically, the modem in IAP transceiver 114 sends the MAC address response as a RF transmission to the modem in the subscriber device transceiver 110. As stated above, the IAP transceiver 114 need not communicate directly with the subscriber device transceiver 110. Rather, the message can be routed through one or more nodes 102 in the wireless ad-hoc network.

In step 11, the ANARP module in the subscriber device transceiver 110 sends an ARP response message including the MAC address to the Admission Control (AC) module. Then, in step 12, the admission control (AC) module delivers the ARP response message to the ARP module in the subscriber device host 108.

It can be further noted from the flowchart in FIG. 3 that if the ANARP module in the subscriber device transceiver 110 identifies an MAC corresponding to the IP address in its local list in step 3, the ARP is passed directly between the IP stacks of the subscriber device host 108 and subscriber device transceiver 110, and normal ARP rules apply. This condition can be considered an optimization technique, or rather, an exception handling technique, in which either the IP stack of the subscriber device host 108 or the IP stack of the subscriber device transceiver 110 issues an ARP request for itself or one another.

Also, if the ANARP module of the IAP host 112 in step 6 does indeed find an MAC entry that matches the IP address in the ARP request, the process proceeds to step 9 during which the ANARP module routes the response including the MAC address to the ANARP relay in the IAP transceiver 114 via the Admission Control (AC) module. The process then continues with steps 10 through 12 as discussed above.

As can be appreciated from the above, the ARP process performed in accordance with the embodiment of the present invention shown in FIGS. 2 and 3 avoids the use of a broadcast message from the subscriber device 102. Accordingly, the ARP request can be satisfied without resulting in undue congestion in the wireless ad-hoc network that would otherwise be caused by broadcasting the ARP to the wireless nodes in the ad-hoc network.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A node, for use in a wireless ad-hoc communications network, and being adapted to transmit and receive data packets to and from other nodes in said wireless ad-hoc network and to operate as a router to route other data packets destined for said other nodes in said wireless ad-hoc network to said other nodes, said node comprising:

an address resolution protocol module, adapted to generate an address resolution protocol (ARP) request for a media access control (MAC) address corresponding to an Internet protocol (IP) address, said MAC address being associated with a device; and a transceiver, adapted to transmit said ARP request for delivery to an access point of a network portion without broadcasting said ARP request to a plurality of said other nodes in said wireless ad-hoc network, said access point being adapted to enable said node to communicate with said network portion.

2. A node as claimed in claim 1, wherein:

said transceiver is adapted to transmit said ARP request to another said node in said wireless ad-hoc network for delivery to said access point.

3. A node as claimed in claim 1, further comprising:

a host device, adapted to generate said data packets for transmission by said transceiver to at least one of said other nodes in said network, said address resolution protocol module being disposed in said host device.

4. A node as claimed in claim 3, wherein:

said host device comprises a device adapted to receive and output multimedia data.

5. A node as claimed in claim 1, wherein:

said device includes another said node on said network.

6. A node as claimed in claim 5, wherein:

said device is affiliated with said access point.

7. A node as claimed in claim 5, wherein:

said device is affiliated with another access point of said network portion.

8. A node as claimed in claim 1, wherein:

said device is on a network other than said network.

9. A node as claimed in claim 1, wherein:

said network portion includes a portion of said wireless ad-hoc communications network.

10. A node as claimed in claim 1, wherein:

said transceiver is adapted to unicast said ARP request for unicast delivery to said access point.

11. A method for controlling a node in a wireless ad-hoc communications network to perform address resolution protocol (ARP), said node being adapted to transmit and receive data packets to and from other nodes in said wireless ad-hoc network and to operate as a router to route other data packets destined for said other nodes in said wireless ad-hoc network to said other nodes, said method comprising:

controlling said node to generate an address resolution protocol (ARP) request for a media access control (MAC) address corresponding to an Internet protocol (IP) address, said MAC address being associated with a device; and controlling said node to transmit said ARP request for delivery to an access point of a network portion without broadcasting said ARP request to a plurality of said other nodes in said wireless ad-hoc network, said access point being adapted to enable said node to communicate with said network portion.

12. A method as claimed in claim 11, wherein:

said transmission controlling controls said node to transmit said ARP request to another said node in said wireless ad-hoc network for delivery to said access point.

13. A method as claimed in claim 11, wherein:

said node comprises a host device, adapted to generate said data packets for transmission by said node to at least one of said other nodes in said network; and said ARP generating controls said host device to generate said ARP request.

14. A method as claimed in claim 13, further comprising:

controlling said host device to receive and output multimedia data.

15. A method as claimed in claim 11, wherein:

said device includes another said node on said network.

16. A method as claimed in claim 15, wherein:

said device is affiliated with said access point.

17. A method as claimed in claim 15, wherein:

said device is affiliated with another access point of said network portion.

18. A method as claimed in claim 11, wherein:

said device is on a network other than said network.

19. A method as claimed in claim 11, wherein:

said network portion includes a portion of said wireless ad-hoc communications network.

20. A method as claimed in claim 11, wherein:

said second controlling step controls said node to unicast said ARP request for unicast delivery to said access point.

21. A computer-readable medium of instructions for controlling a node in a wireless ad-hoc communications network to perform address resolution protocol (ARP), said node being adapted to transmit and receive data packets to and from other nodes in said wireless ad-hoc network and to operate as a router to route other data packets destined for said other nodes in said wireless ad-hoc network to said other nodes, said computer-readable medium of instructions comprising:

a first set of instructions, adapted to control said node to generate an address resolution protocol (ARP) request for a media access control (MAC) address corresponding to an Internet protocol (IP) address, said MAC address being associated with a device; and a second set of instructions, adapted to control said node to transmit said ARP request for delivery to an access point of a network portion without broadcasting said ARP request to a plurality of said other nodes in said wireless ad-hoc network, said access point being adapted to enable said node to communicate with said network portion.

22. A computer-readable medium of instructions as claimed in claim 21, wherein:

said second set of instructions is adapted to control said node to transmit said ARP request to another said node in said wireless ad-hoc network for delivery to said access point.

23. A computer-readable medium of instructions as claimed in claim 21, wherein:

said node comprises a host device, adapted to generate said data packets for transmission by said node to at least one of said other nodes in said network; and said first set of instructions is adapted to control said host device to generate said ARP request.

24. A computer-readable medium of instructions as claimed in claim 23, further comprising:

a third set of instructions, adapted to control said host device to receive and output multimedia data.

25. A computer-readable medium of instructions as claimed in claim 21, wherein:

said device includes another said node on said network.

26. A computer-readable medium of instructions as claimed in claim 25, wherein:

said device is affiliated with said access point.

27. A computer-readable medium of instructions as claimed in claim 25, wherein:

said device is affiliated with another access point of said network portion.

28. A computer-readable medium of instructions as claimed in claim 21, wherein:

said device is on a network other than said network.

29. A computer-readable medium of instructions as claimed in claim 21, wherein:

said network portion includes a portion of said wireless ad-hoc communications network.

30. A computer-readable medium of instructions as claimed in claim 21, wherein:

said second set of instructions is adapted to control said node to unicast said ARP request for unicast delivery to said access point.

31. A wireless ad-hoc communications network, comprising:

at least one node, adapted to transmit and receive data packets to and from other nodes in said wireless ad-hoc network, and to operate as a router to route other data packets destined for said other nodes in said wireless ad-hoc network to said other nodes; and an access point, adapted to enable said node to communicate with a network portion;

said node being further adapted to generate an address resolution protocol (ARP) request for a media access control (MAC) address corresponding to an Internet protocol (IP) address, said MAC address being associated with a device, and to transmit said ARP request for delivery to said access point without broadcasting said ARP request to a plurality of said other nodes in said wireless ad-hoc network.

32. A wireless ad-hoc communications network as claimed in claim 31, wherein:

said node is further adapted to transmit said ARP request to another said node in said wireless ad-hoc network for delivery to said access point.

33. A wireless ad-hoc communications network as claimed in claim 31, wherein said node further comprises:

a host device, adapted to generate said data packets for transmission by said node to at least one of said other nodes in said network, and to generate said ARP request.

34. A wireless ad-hoc communications network as claimed in claim 33, wherein:

said host device comprises a device adapted to receive and output multimedia data.

35. A wireless ad-hoc communications network as claimed in claim 31, wherein:

said access point is further adapted to send said MAC address to said node.

36. A wireless ad-hoc communications network as claimed in claim 31, wherein:

said device includes another said node on said network.

37. A wireless ad-hoc communications network as claimed in claim 36, wherein:

said device is affiliated with said access point.

38. A wireless ad-hoc communications network as claimed in claim 33, wherein:

said device is affiliated with another access point of said network portion.

39. A wireless ad-hoc communications network as claimed in claim 31, wherein:

said device is on a network other than said network.

40. A wireless ad-hoc communications network as claimed in claim 31, wherein:

said network portion includes a portion of said wireless ad-hoc communications network.

41. A wireless ad-hoc communications network as claimed in claim 31, wherein:

said node is adapted to unicast said ARP request for unicast delivery to said access point.

42. A method for operating a wireless ad-hoc communications network, comprising:

providing at least one node, adapted to transmit and receive data packets to and from other nodes in said wireless ad-hoc network, and to operate as a router to route other data packets destined for said other nodes in said wireless ad-hoc network to said other nodes;

providing an access point, adapted to enable said node to communicate with a network portion; and controlling said node to generate an address resolution protocol (ARP) request for a media access control (MAC) address corresponding to an Internet protocol (IP) address, said MAC address being associated with a device, and to transmit said ARP request for delivery to said access point without broadcasting said ARP request to a plurality of said other nodes in said wireless ad-hoc network.

43. A method for operating a wireless ad-hoc communications network as claimed in claim 42, wherein:

said controlling controls said node to transmit said ARP request to another said node in said wireless ad-hoc network for delivery to said access point.

44. A method for operating a wireless ad-hoc communications network as claimed in claim 42, further comprising:

controlling a host device of said node to generate said data packets for transmission by said node to at least one of said other nodes in said network, and to generate said ARP request.

45. A method for operating a wireless ad-hoc communications network as claimed in claim 44, wherein:

said host device comprises a device adapted to receive and output multimedia data.

46. A method for operating a wireless ad-hoc communications network as claimed in claim 42, further comprising:

controlling said access point to send said MAC address to said node.

47. A method for operating a wireless ad-hoc communications network as claimed in claim 42, wherein:

said device includes another said node on said network.

48. A method for operating wireless ad-hoc communications network as claimed in claim 47, wherein:

said device is affiliated with said access point.

49. A method for operating a wireless ad-hoc communications network as claimed in claim 47, wherein:

said device is affiliated with another access point of said network portion.

50. A method for operating wireless ad-hoc communications network as claimed in claim 42, wherein:

said device is on a network other than said network.

51. A method for operating a wireless ad-hoc communications network as claimed in claim 42, wherein:

said network portion includes a portion of said wireless ad-hoc communications network.

52. A method as claimed in claim 42, wherein:

said controlling step controls said node to unicast said ARP request for unicast delivery to said access point.

* * * * *